(12) United States Patent
Wong et al.

(10) Patent No.: US 12,346,455 B2
(45) Date of Patent: Jul. 1, 2025

(54) SECURITY RISK ASSESSMENT SYSTEM FOR A DATA MANAGEMENT PLATFORM

(71) Applicant: Rubrik, Inc., Palo Alto, CA (US)

(72) Inventors: Argin Wong, San Francisco, CA (US); Brian Gyorkos, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 264 days.

(21) Appl. No.: 18/082,569

(22) Filed: Dec. 15, 2022

(65) Prior Publication Data

US 2023/0376608 A1 Nov. 23, 2023

Related U.S. Application Data

(60) Provisional application No. 63/343,875, filed on May 19, 2022.

(51) Int. Cl.
*G06F 21/00* (2013.01)
*G06F 9/455* (2018.01)
*G06F 21/57* (2013.01)

(52) U.S. Cl.
CPC ........ *G06F 21/577* (2013.01); *G06F 9/45558* (2013.01); *G06F 2009/45587* (2013.01)

(58) Field of Classification Search
CPC ........................ G06F 21/557; G06F 9/45558
See application file for complete search history.

(56) References Cited

U.S. PATENT DOCUMENTS

| | | | | |
|---|---|---|---|---|
| 7,437,764 | B1 * | 10/2008 | Sobel | G06F 21/562 713/176 |
| 2015/0256621 | A1 * | 9/2015 | Noda | G06F 3/0605 709/226 |
| 2017/0034023 | A1 * | 2/2017 | Nickolov | H04L 43/0817 |
| 2021/0136117 | A1 * | 5/2021 | Kuppannan | H04L 63/20 |

* cited by examiner

*Primary Examiner* — Jeffrey C Pwu
*Assistant Examiner* — Thong P Truong
(74) *Attorney, Agent, or Firm* — Holland & Hart LLP

(57) ABSTRACT

A virtual machine management system may support backup and recovery for virtual machines that support various applications. The virtual machine management system may process a backup snapshot of the virtual machine to identify security risks in the virtual machine. A cloud platform may communicate with the virtual machine management system to support backup processing. The cloud platform may identify security configuration information and transmit such information and transmit indications of the information to the virtual machine management system. The cloud platform may receive an indication of one or more security risks and generate notifications that indicate the security risks.

17 Claims, 11 Drawing Sheets

SECURITY RISK ASSESSMENT SYSTEM FOR A DATA MANAGEMENT PLATFORM

RELATED APPLICATIONS

This application claims priority to U.S. Provisional Patent Application No. 63/343,875 filed May 19, 2022 and entitled "SECURITY RISK ASSESSMENT SYSTEM FOR A DATA MANAGEMENT PLATFORM"; the disclosure of which is incorporated by reference herein in its entirety.

FIELD OF TECHNOLOGY

The present disclosure relates generally to database systems and data processing, and more specifically to security risk assessment system for a data management platform.

BACKGROUND

A computing system may be employed to manage, process, backup, and restore data using a network of computing devices.

Production environments may execute virtual machines to support various applications, such as a web server, database server, and/or an application server. The production environments may support execution of agents or processes that scan the environments for security vulnerabilities. However, execution of these agents or processes by the production environment may result in increased latency in the system, as the agents or processes may utilize processing resources at the production environment. Further, these agents or processes may need to be configured for the particular environment or virtual machine.

DETAILED DESCRIPTION

Figure 1:
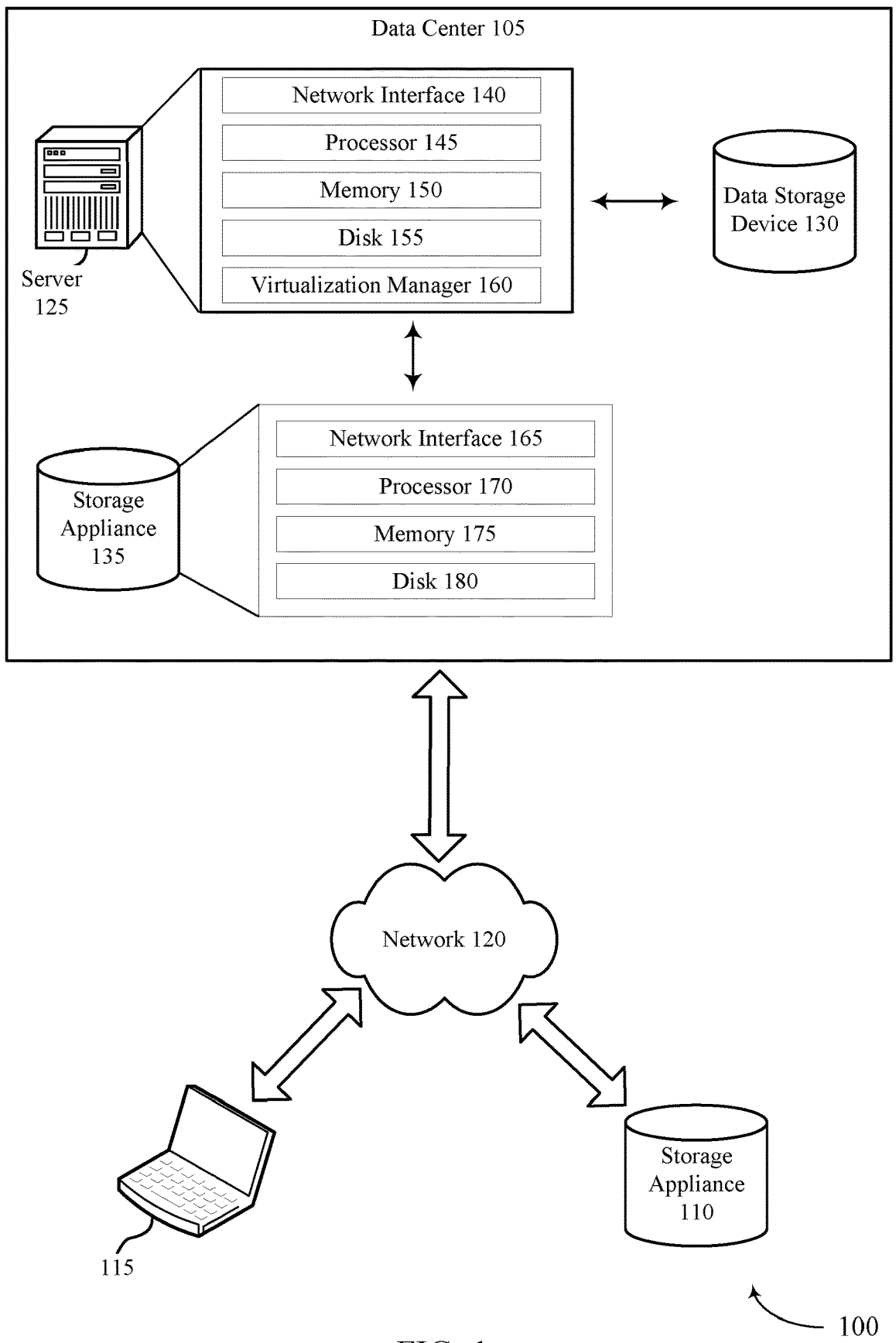
FIG. 1 illustrates an example of a data management system that supports security risk assessment system for a data management platform in accordance with aspects of the present disclosure.

Production environments may execute virtual machines to support various applications, such as a web server, database server, and/or an application server. The production environments may support execution of agents or processes that scan the environments for security vulnerabilities. However, execution of these agents or processes by the production environment may result in increased latency in the system, as the agents or processes may utilize processing resources at the production environment. Further, these agents or processes may need to be configured for the particular environment or virtual machine.

A data management system (e.g., a storage appliance) may read data from and write data to virtual machine environments to support environment backup and recovery. For example, a data management system may periodically read data from a source system to support backup of a virtual machine executing on the source system (e.g., the production environment), and the data management system may write data to a target system to support recovery of a virtual machine associated with a backup.

Techniques described herein support processing, by the data management system, backups to identify security vulnerabilities. Thus, rather than executing agents on the virtual machine at the production environment, the backups may be processed in a separate system (referred to as a virtual machine management system, a data management system, or a storage appliance herein), which may reduce the resource overhead at the production environment and reduce configuration requirements at the virtual machine and production environment. To support backup scanning, the data management system may process a backup snapshot (e.g., a virtual machine image) that represents the state of the virtual machine and the data of the virtual machine.

A cloud platform may support various virtual machine management systems that process backup snapshots in order to identify vulnerabilities or security configurations at one or more virtual machines. More particularly, a virtual machine management system (e.g., a storage appliance) may support virtual machine backup, scanning, and recovery for multiple virtual machine environments. A cloud platform may interface with the virtual machine management system (as well as other virtual machine management systems supporting the same or other production environments) in order to provide relevant and timely security configuration information to support backup processing. Additionally, the cloud platform may support aggregation and display of security vulnerability information and security configuration information identified by processing of backups by one or more virtual machine management systems. As such, the cloud platform may give an organization a complete picture of production environments that may be dispersed in various geographical locations.

Aspects of the disclosure are initially described in the context of an environment supporting data backup and recovery management. Aspects of the disclosure are further described with respect to a server, a storage appliance, a computing system, and a process flow. Aspects of the disclosure are further illustrated by and described with reference to apparatus diagrams, system diagrams, and flowcharts that relate to security risk assessment system for a data management platform.

FIG. 1 illustrates an example of a computing environment 100 that supports security risk assessment system for a data management platform in accordance with aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. network interface 140 allows server 125 to connect to one or more networks 120. network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks. Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

The server 125 may represent a production environment for an organization, as the server 125 may represent computing systems that support virtual machines that are configured to execute various applications, such as an application server, web server, or a database server that may be accessed using client systems (e.g., computing device 115). In some cases, the server 125 and/or the supported virtual machines may execute agents or processes that are used to identify security vulnerabilities such as viruses, backdoors, out of date or comprised software, etc. These agents or processes may scan the execution environments to identify such vulnerabilities. As these agents and processes may execute at the production environments, the agents and processes may utilize processing and memory resources otherwise used by production systems. Further, as virtual machines may utilize different operating systems, may be supported by different operating systems, and may be configured for various operations, the scanning agents or processes may be configured for the particular virtual machine, which may require significant administrative overhead.

As described herein, the storage appliance 135 may support ingestion or reading of backup data (e.g., backup snapshots) of a virtual machine environment to support virtual machine backup and recovery. Implementations described herein support processing of a backup snapshot generated by a virtual machine to identify security vulnerabilities. As such, rather than scanning on at the virtual machine/production environment, the backup snapshots may be processed away from the virtual machine/production environment and in the storage appliance 135. Accordingly, processing, resource, and administrative overhead may be reduced at the server 125. Further, as a backup snapshot may represent a state of the virtual machine and the data associated with the virtual machine, the backup snapshots may support security vulnerability identification.

Additionally, a cloud platform described herein may communicate with various storage appliances 135 (e.g., also referred to as a virtual machine management system or data management system) in order to support backup scanning, security risk/vulnerability identification, and aggregated system overviews. The cloud platform may be supported by the server 125, the data center 105, and or other systems (e.g., the network 120). The cloud platform may interface with various storage appliances 135, 110, and data centers 105 for backup processing and reporting. In some examples, the cloud platform may identify security configuration information from various data sources, including software suppliers, crowd-sourced data sources, other common configuration data sources, and the like. The information may be transmitted to various virtual machine management systems (e.g., storage appliance 135) for use for backup processing. The cloud platform may receive an indication of security risks associated with virtual machines based on processing of the backups by the storage appliance 135 and generate a notification based on the security risks identified via the backup processing.

As described herein, the storage appliance 135 may be implemented virtually by a virtualization manager (e.g., the virtualization manager 160) of server 125. Thus, the storage appliance 135 may be hosted by one or more systems that support a production environment, but may be supported by resources that are designated for the storage appliance 135. Thus, in a cloud environment, the storage appliance 135 may be allocated resources for use in supporting the techniques described herein. Accordingly, a virtualized storage appliance may read, process, and manage backup date of the virtual machines as described herein.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
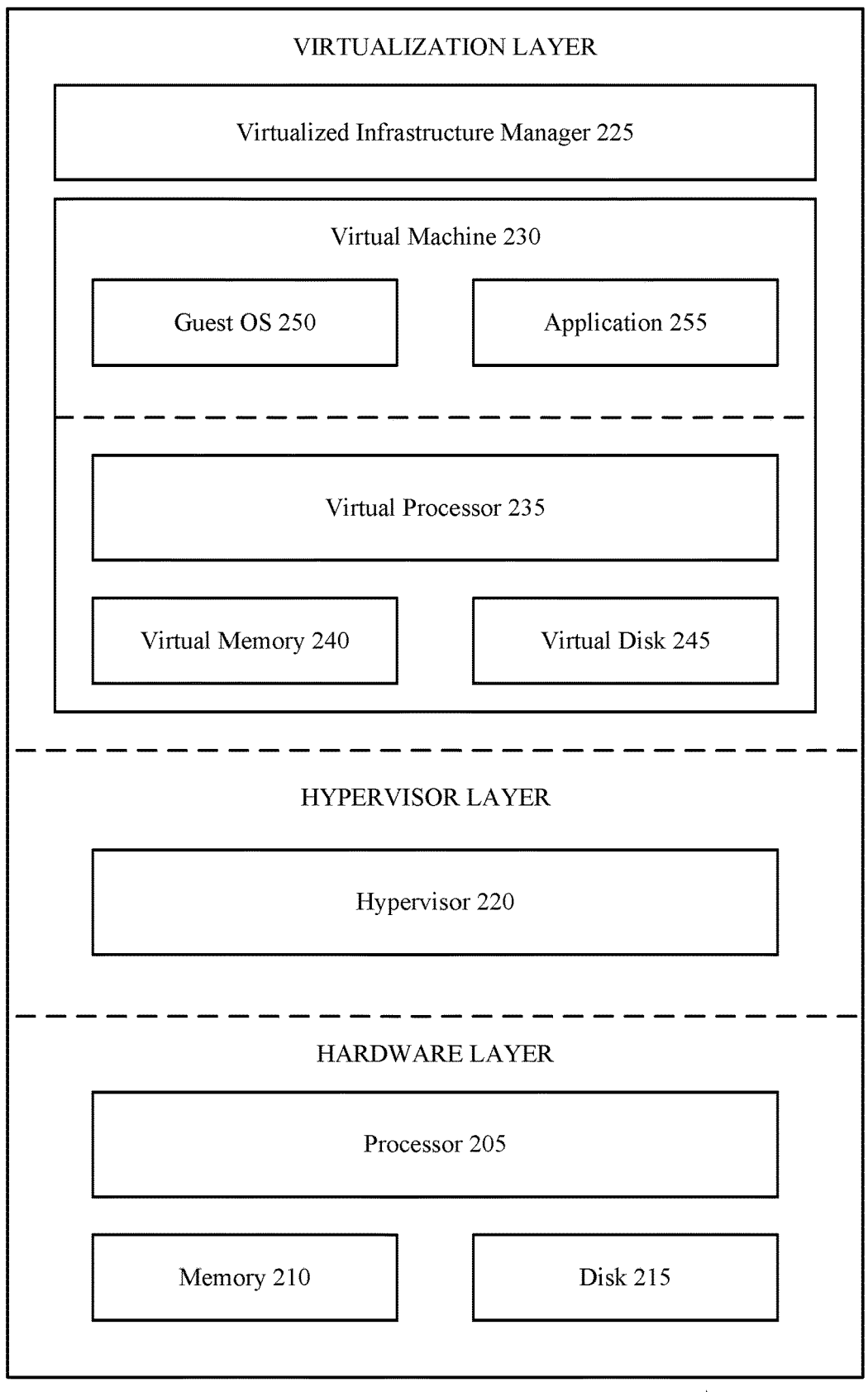
FIG. 2 illustrates an example of a server that supports security risk assessment system for a data management platform in accordance with aspects of the present disclosure.

FIG. 2 illustrates an example of a server 200 that supports security risk assessment system for a data management platform in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more virtual disks 245. In one example, a virtual machine 230 may include a plurality of virtual disks 245, with each virtual disk of the plurality of virtual disks 245 associated with a different file stored on the one or more virtual disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, the server 200 may support various virtual machines 230 that a support applications 255, such as an application server, webserver, and/or database server. Further, the server 200 may support the virtualized infrastructure manager 225 that may implement techniques for virtual machine backup and recovery. Further, another system, such as a storage appliance (e.g., virtual machine management system) described herein, may read data from virtual machines 230 for extended backup and recovery techniques. Techniques described herein support processing of backup snapshots generated at the server 200. The backup snapshots may be processed in a system separate from the server 200 and the virtual machines 230 to reduce processing load at the server 200 and the virtual machines 230. Thus, latency and other metrics may be improved at the server 200 and the virtual machines 230. Accordingly, the virtual machines 230 may generate the backup snapshots as described herein, and the backup snapshots may be processed at an external system (e.g., storage appliance) for security vulnerability identification. Further, as described herein, a cloud platform may communicate with various storage appliances or virtual machine management systems to support backup processing and to support secure and up-to-date virtual machine environments, such as servers 200.

Figure 3:
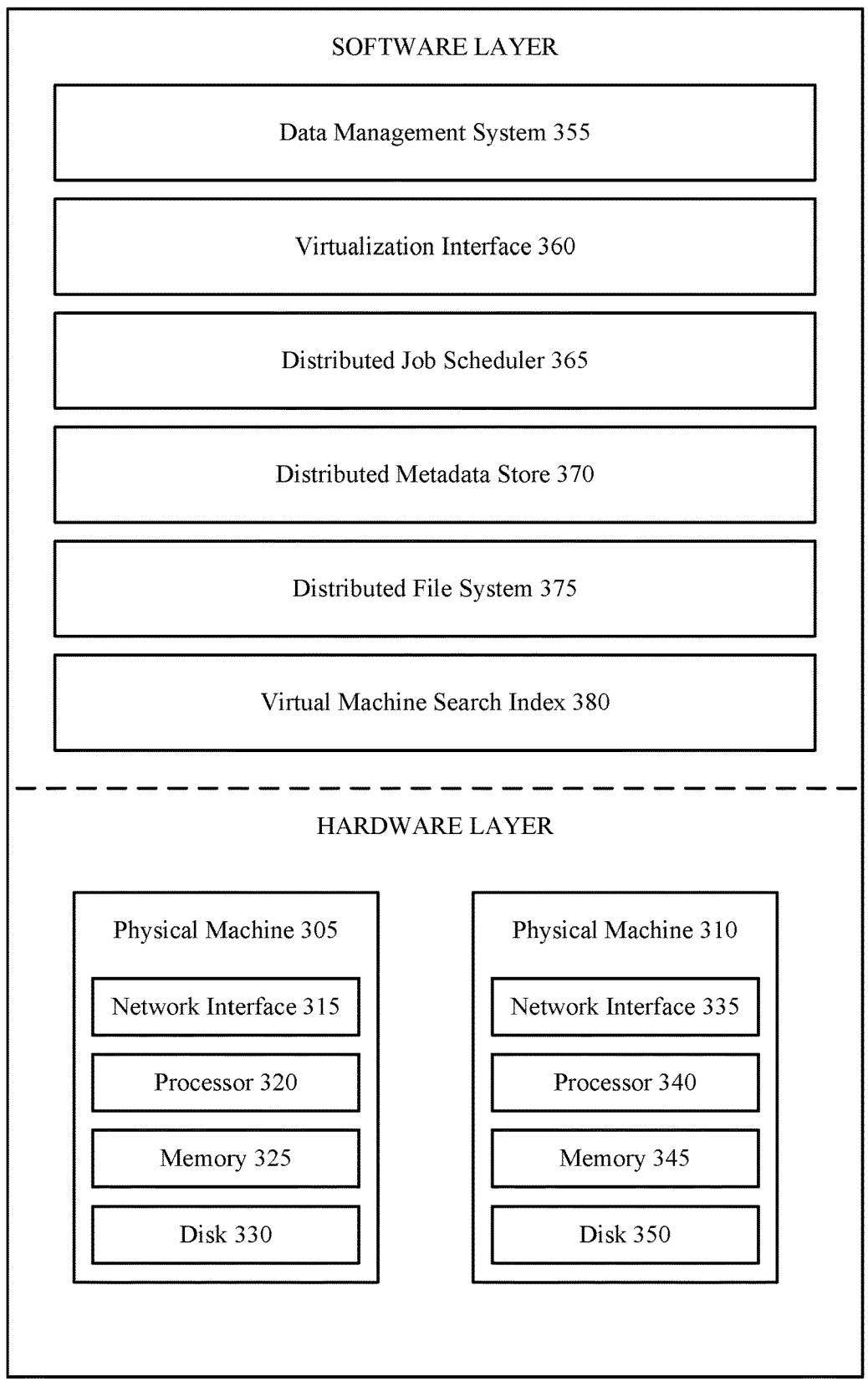
FIG. 3 illustrates an example of a storage appliance that supports security risk assessment system for a data management platform in accordance with aspects of the present disclosure.

FIG. 3 illustrates an example of a storage appliance 300 that supports security risk assessment system for a data management platform in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310.

The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally, or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshotsNM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at isnapshotsNM_B/sl/sl.c-hunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300, which may also be referred to as a virtual machine management system, may support virtual machine backup and recovery procedures. For example, the storage appliance 300 may ingest backup data (e.g., snapshot data) from one or more virtual machines supported by a host system and store and/or persist the backup data at the disk 330 and/or the disk 350 of the storage appliance 300 via the distributed file system 375 or at another storage system (e.g., a cloud storage system). If a virtual machine associated with backup supported by the storage appliance 300 fails, then the storage appliance 300 may support recovery of the virtual machine at a target system. Recovery of the virtual machine on a target or host system may include writing data of the virtual machine to a virtual disk. Thus, the storage appliance 300 may be configured to read and/or write virtual machine data to support backup and recovery procedures.

The storage appliance 300 may process backup snapshots to identify security vulnerabilities at the virtual machines. Accordingly, the storage appliance 300 may receive the backup snapshots generated by a virtual machine (or a virtual machine utility) for storage and recovery procedures as well as for security risk identification. To identify the security risks, the storage appliance 300 may process a backup snapshot generated by the virtual machine and generate an index of software packages that are executing or installed on the virtual machine. The storage appliance 300 may also identify software versions of the software packages installed on the virtual machines. The storage appliance 300 may compare the index to a list of known vulnerabilities to identify security risks at the virtual machine. The storage appliance 300 may trigger a notification that indicates a result of the comparing (e.g., a notification indicating an identified vulnerability). In some examples, the storage appliance 300 may determine a set of network configurations implemented by the virtual machine by processing the backup snapshot. The identified set of network configurations may be used in conjunction with the index of software packages to identify security risks.

A cloud platform may communicate with the storage appliance 300 to support security risk identification via backup scanning as well as other backup and recovery procedures. The cloud platform may communicate with multiple storage appliances to support these procedures. In some cases, the cloud platform may identify security configuration information and provide such information to the storage appliance 300 (e.g., in the form of the list of known vulnerabilities, a list of security configurations, or both). The information may be periodically updated and provided to the various storage appliances 300 for up-to-date backup processing support. After processing backup snapshots in accordance with the updated information (e.g., security configuration information), the storage appliance 300 may transmit an indication of one or more identified security risks, resulting from the backup processing, to the cloud platform. The cloud platform may aggregate security risk information from multiple storage appliances (e.g., storage appliance 300) for display at a user interface. As such, using various storage appliances, the cloud platform may support identification of security risks across virtual machine environments that are associated with an organization.

Figure 4:
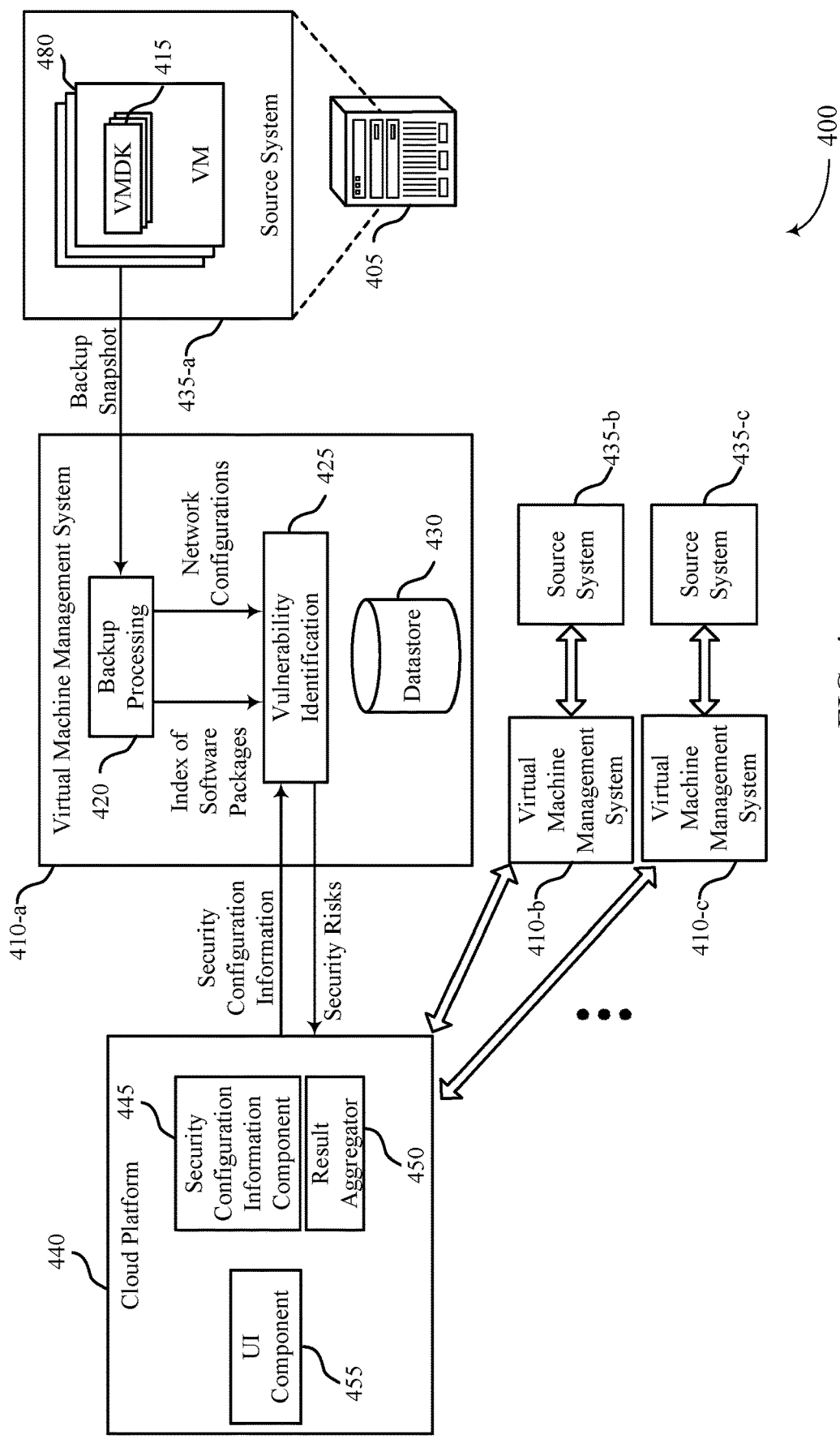
FIG. 4 illustrates an example of a computing system that supports security risk assessment system for a data management platform in accordance with aspects of the present disclosure.

FIG. 4 illustrates an example of a computing system 400 that supports security risk assessment system for a data management platform in accordance with aspects of the present disclosure. The computing system 400 includes a server 405, a virtual machine management system 410, and a cloud platform 440. The server 405 may be an example of a server as described with respect to FIGS. 1 through 3 and may support a system for hosting virtual machines, such as virtual machines 480. The virtual machine management system 410 may be an example of a storage appliance as described with respect to FIGS. 1 through 3. A described herein, the virtual machine management systems 410 may represent multiple machines and/or nodes of a storage cluster. The virtual machine management systems 410 may support backup and recovery procedures for various virtual machines hosted on source systems 435, as described herein. For example, virtual machine management systems 410 may interface with the server 405 in support of backup and recovery procedures for virtual machine 480 hosted by source system 435-a and associated components (e.g., virtual disks 415) supported by the server 405.

As described herein, the virtual machine management system 410 may support backup processing for security vulnerability identification. For example, as the virtual machine management system 410 receives backup data (e.g., backup snapshots) for virtual machines 480 (or other environments), the virtual machine management system 410 may process the backup snapshot using a backup processing component 420. The backup processing component 420 may be configured to virtually mount a backup snapshot to perform the processing. To virtually mount the backup snapshot, the virtual machine management system 410 may use a file system (e.g., Filesystem in userspace (FUSE)). Thus, rather than hydrating and mounting an entire virtual disk (e.g., virtual disk 415) of the virtual machine 480, the relevant bytes of data are read directly from the virtually mounted backup snapshot. That is, the parts of the filesystem that are used for vulnerability identification are read. In reading the relevant portions of the filesystem of the backup snapshot, the virtual machine management system 410 may generate an index of software packages, which may also be referred to as a software bill of materials (SBOM). The index of software packages may list the software packages that are installed, present, and/or executing on the source system 435-a and the corresponding versions. A software package may be present, but not necessarily yet installed on the source system 435-a. For example, an update may be downloaded and held in temporary space, and the processing may identify that this downloaded software or update may pose security risks based on vulnerabilities or may be modified (e.g., based on a checksum). Additionally, in processing the backup snapshot, the virtual machine management system 410 may determine a set of network configurations that is implemented by the virtual machine. Thus, in reading the backup data, the virtual machine management system 410 may be configured to read the portions of the backup data that include the network configurations.

After generation of the index of software packages, the network configurations, and/or file checksums, a vulnerability information component 425 may identify security vulnerabilities or security risks. For example, the virtual machine management system 410-*a* is provided security configuration information from the cloud platform 440. The virtual machine management system 410-*a* may be connected to a feed that provides the security configuration information, and the feed may be periodically updated. The virtual machine management system 410-*a* may compare the index software packages (in addition to the network configurations and/or checksums) generated based on processing the backup snapshot of the virtual machine 480 to the security configuration information to identify any security risks. The security configuration information may include a list of software packages, and associated versions, with known security risks. Thus, if the index of software packages includes a software package/version that is on the list, then the virtual machine management system 410 may identify a security risk. The virtual machine management system 410-*a* may also identify a security risk as a result of the file checksums and/or network configurations. For example, if the virtual machine management system 410-*a* determines, based on the network configurations, that an attack surface is exposed (e.g., an open port through which an attacker can exploit a vulnerable package), then the virtual machine management system 410-*a* identifies a security risk. In some examples, the network configurations may be used in conjunction with the index of software packages to identify the security risks.

The virtual machine management system 410-*a*, by processing the backup snapshot, may generate a list of vulnerable packages, network configurations, or other information that are present on the virtual machine 480. The virtual machine management system 410-*a* may trigger a notification that is indicative of the vulnerable software packages and the virtual machine 480 that has the vulnerable packages. In some cases, a notification or result (e.g., result information) of the backup processing is transmitted to the cloud platform 440. The notification may include one or more steps for remediation, such as software updates, configuration changes, or the like. The result information transmitted to the cloud platform 440 may include indications of virtual machines and/or hosts with identified security risk, the type of risk, the software package associated with the risk, the network configuration causing the risk, or any combination thereof.

The virtual machine management systems 410 may be configured to support cloud and/or software as a service (SaaS) based services, communication services, online storage, other cloud platforms, databases, etc. Thus, while the virtual machine management systems 410 are illustrated as supporting on-premises virtual machines, the virtual machine management systems 410 (e.g., storage appliances) may support other local and cloud based service types. It should be understood that the techniques described herein may be implemented in various environments and services.

As illustrated, the cloud platform 440 may be configured to communicate with various virtual machine management systems 410. The various virtual machine management systems 410 may be positioned in various geographical locations and used to support associated source systems and corresponding virtual machines for backup and recovery.

Additionally, the virtual machine management systems 410 may perform backup processing for security risk identification as described herein with respect to virtual machine management system 410-*a*.

The cloud platform 440 may be configured to orchestrate backup processing for the virtual machine management systems 410, among other procedures. For example, a security configuration information component 445 of cloud platform 440 may be configured to identify and aggregate security configuration information for virtual machines from various sources and provide the security information to the virtual machine management systems 410 to use for backup processing. In some examples, to support the virtual machine management systems 410, the cloud platform 440 may format the security configuration information such that the information is ingestible and usable by the virtual machine management system 410-*a* for backup processing. In some examples, the virtual machine management system 410-*a* may store the security configuration information in a datastore 430. The datastore 430 may also store other information, such as processing results, backup data, etc.

As described herein the security configuration information may include various types of information, such as current software versions (or out of date software), software vulnerabilities, best practices and hardening configurations, customer or organization common configurations, antivirus and antimalware assessment information, customer-defined practices, or the like. The security configuration information component 445 may be configured to access various data sources to identify current software versions. In some examples, the security configuration information component periodically checks software provider endpoints for current or up-to-date software versions and maintains a listing. Using this information, the virtual machine management systems 410 may be able to check a backed up system (e.g., virtual machines 480) for differences between installed software and current version of software, to check whether an operating system version is current, and/or to check whether software applications are out of date. The information may be identified using scanning or indexing tools. In some examples, the information provided the virtual machine management systems may be tools that are configured for scanning, such as antivirus or antimalware scanning tools that are executed by the virtual machine management system 410. The security configuration information may be accessed using various APIs and/or provided to virtual machine management systems 410 using APIs.

The software vulnerability information may be identified by the security configuration information component 445 by accessing public data feeds. For example, some software information providers may maintain a list of vulnerabilities. Authoritative sources may include the National Institute of Standards Technology (NIST), the National Vulnerability Database (NVD), Microsoft, VMWare, open source package providers like Canonical, and other sources including AusCERT, TippingPoint, Zero Day Initiative, and the like. The security configuration information component 445 may periodically update the software vulnerability information or may be provided with such information and maintain a list.

The best practices and hardening configurations may be identified by the security configuration information component 445 and used to assess backups against sources such as the Center for Internet Security (CIS) Benchmarks. As such, this information may be used by the virtual machine management system 410 to report on which aspects of benchmarks and hardening configurations are not enabled.

Additionally, the security configuration information component 445 may aggregate common configuration information across organizations and users including information aggregated from the virtual machine management systems 410. This information may include common operating systems, common system software, common configurations (e.g., network configurations), etc. Thus, this information may be used to assess a given environment against the broader environments to give organizations information about security and configuration practices. In one example, the security configuration information component 445 may determine that 90% of customers disable the secure shell protocol (SSH), and that one environment (e.g., a virtual machine 480) does not have SSH disabled.

Further, the security configuration information component 445 may integrate with antivirus and antimalware solution providers such as McAffee, Symantec, Kaspersky, VirtusTotal, and the like, to identify viruses and malware within files or other data in a backup. Moreover, an organization may define specific configurations (e.g., files for checksums) that the virtual machine management systems 410 are to perform on backup data.

This information may be periodically provided to the virtual machine management system 410 using various communication procedures, such as API calls. In some examples, the virtual machine management systems 410 may be configured to periodically check for such information from the various sources.

As described herein, the virtual machine management systems 410 may provide an indication of the backup processing results, including indications of identified security risks, to the cloud platform 440. Further, the cloud platform may identify information about the security risks, recommended remediation, links to authoritative sources for information, and links to fixes, and this information may be included in an alert or notification. This information may be provided via a UI component 455 of the cloud platform. That is, the UI component 455 may be used to alert users or administrators of the backup processing results. In some cases, the results may be identified from source systems (e.g., source system 435-a) that is configured to identify security risks/vulnerabilities during backup creation.

A result aggregator component 450 may receive the results of backup processing by various virtual machine management systems 410 and aggregate the results. In some examples, the results corresponding to one tenant or organization are aggregated. The aggregated results may be displayed at a user interface, such as UI component 455. For example, the UI component 455 may display aggregated information for security risks identified by backup processing. In some examples, the UI component 455 may transmit notifications indicative of the aggregated results, such as push notifications, text messages, phone calls, emails, event logs, and the like. The UI component 455 may indicate a quantity of virtual machines (e.g., managed by multiple virtual machine management systems 410) that are in compliance and/or out of compliance, a total quantity of security risks across the managed virtual machines, or both. In some examples, the user interface may display details (e.g., in response to a selection) related to identified security risks, such as severity, type, classification, location, or the like. Severity ratings may be based on independent authoritative sources, customer defined configurations, etc. In some examples, low level security risk may be filtered from display. Further, the UI component may display locations of the security risk (e.g., at a geographical or system level).

In some examples, the cloud platform 440 may be supported by computing components within an organization or tenant's environment. More particularly, the server 405 that supports the source system 435-a and the virtual machines 480 may represent computing systems that also support the virtual machine management system 410-a and the cloud platform 440. Thus, the cloud platform 440 and the virtual machine management system 410-a may be supported by an organization's environment or by cloud systems associated with an organization, physical hardware systems, virtual systems, and the like. This example implementation of the computing system 400 may support the techniques described herein. In some examples, the cloud platform 440 may process the backup data (e.g., the backup snapshot) generated by the virtual machines 480. As such, some or all of the backup snapshot data may be communicated to or accessed by the cloud platform 440 for backup processing. Some or all of the backup processing techniques described herein may be performed by the cloud platform 440, rather than the virtual machine management system 410-a. In some examples, the cloud platform 440 and the virtual machine management system 410-a may share or otherwise distribute the backup processing.

Figure 5:
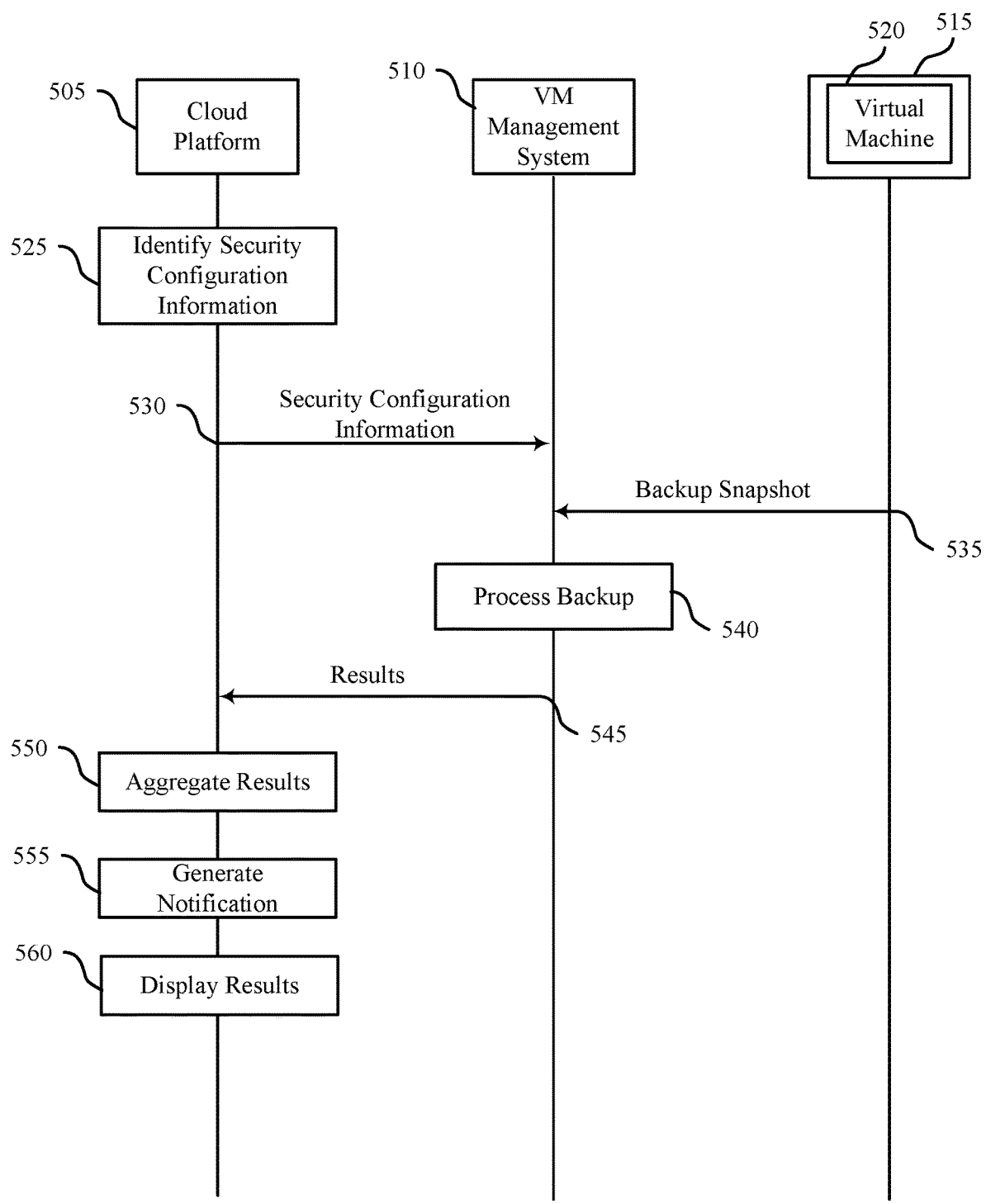
FIG. 5 illustrates an example of a process flow that supports security risk assessment system for a data management platform in accordance with aspects of the present disclosure.

FIG. 5 illustrates an example of a process flow 500 that supports security risk assessment system for a data management platform in accordance with aspects of the present disclosure. The process flow 500 includes a cloud platform 505, a virtual machine management system 510, and a virtual machine 520 supported by virtual machine host 515. The virtual machine management system 510 may be an example of aspects of a storage appliance or a virtual machine management system as described with respect to FIGS. 1 through 4. The cloud platform 505 may be an example of a cloud platform as described with respect to FIGS. 1 through 4. The virtual machine host 515 may be an example of aspects of a server or various physical and logical components of a server as described herein, and the virtual machine 520 may be an example of other virtual machines described herein.

In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some operations are performed in a different order than described or are not performed at all. In some cases, operations may include additional features not mentioned below, or further steps may be added.

At 525, the cloud platform 505 may identify security configuration information associated with virtual machines. In some examples, to identify the security configuration information, the cloud platform 505 may receive one or more indications of current software versions of a set of software packages installed on a set of virtual machines supported by the plurality of virtual machine management systems. This information may be in the form of scanning tools. In some cases, to identify the security configuration information, the cloud platform 505 may receive one or more indications of security vulnerabilities associated with a set of software packages installed on a set of virtual machines supported by the plurality of virtual machine management systems. To identify the security configuration information, the cloud platform 505 may receive one or more indications of recommended configuration parameters associated with a set of software packages installed on a set of virtual machines supported by the plurality of virtual machine management systems. To identify the security configuration information, the cloud platform may receive, via a user interface (e.g., a API, GUI, etc.), an indication of one or more target files of the virtual machines, an indication of one or more target configurations of the virtual machines, or both.

At 530, the cloud platform 505 may transmit, to the virtual machine management system 510, an indication of the security configuration information that is configured for ingestion by the virtual machine management system. The virtual machine management system may use the security configuration information in processing backup snapshots generated by virtual machines to identify security vulnerabilities. The security configuration information may be transmitted using an API, a link, or via other communication procedures.

At 535, the virtual machine management system 510 may receive a backup snapshot from the virtual machine 520 (e.g., via the virtual machine host 515). At 540, the virtual machine management system 510 may process the backup snapshot to identify security risks (or other backup processing results). As described herein, some aspects of processing the backup snapshot may be performed by the cloud platform 505. Thus, the cloud platform 505 may receive the backup data and perform backup processing to identify security risks.

At 545, the cloud platform 505 may receive, from the virtual machine management system, an indication of one or more security risks of the virtual machine 520 managed by the virtual machine management system 510. As described, the one or more security risks are identified by the virtual machine management system based on processing of backup snapshots generated by the virtual machines and using the security configuration information.

At 550, the cloud platform 505 may receive from one or more additional virtual machine management systems, an indication of one or more security risks of virtual machines managed by the one or more additional virtual machine management systems and aggregate information associated with the one or more security risks of virtual machines managed by the one or more additional virtual machine management systems with the one or more security risks of the virtual machine managed by the virtual machine management system.

At 555, the cloud platform 505 may generate a notification that indicates the one or more security risks and an identifier of the virtual machine. The notification may be transmitted via a UI, a GUI, a text message, an email, a push notification, or the like. At 560, the cloud platform 505 may cause display of a user interface that includes the aggregated information. The user interface may indicate a number of virtual machines that are in compliance or out of compliance based at least in part on the one or more security risks, a number of total security risks across virtual machines managed by the plurality of virtual machine management systems, or a combination thereof.

Figure 6:
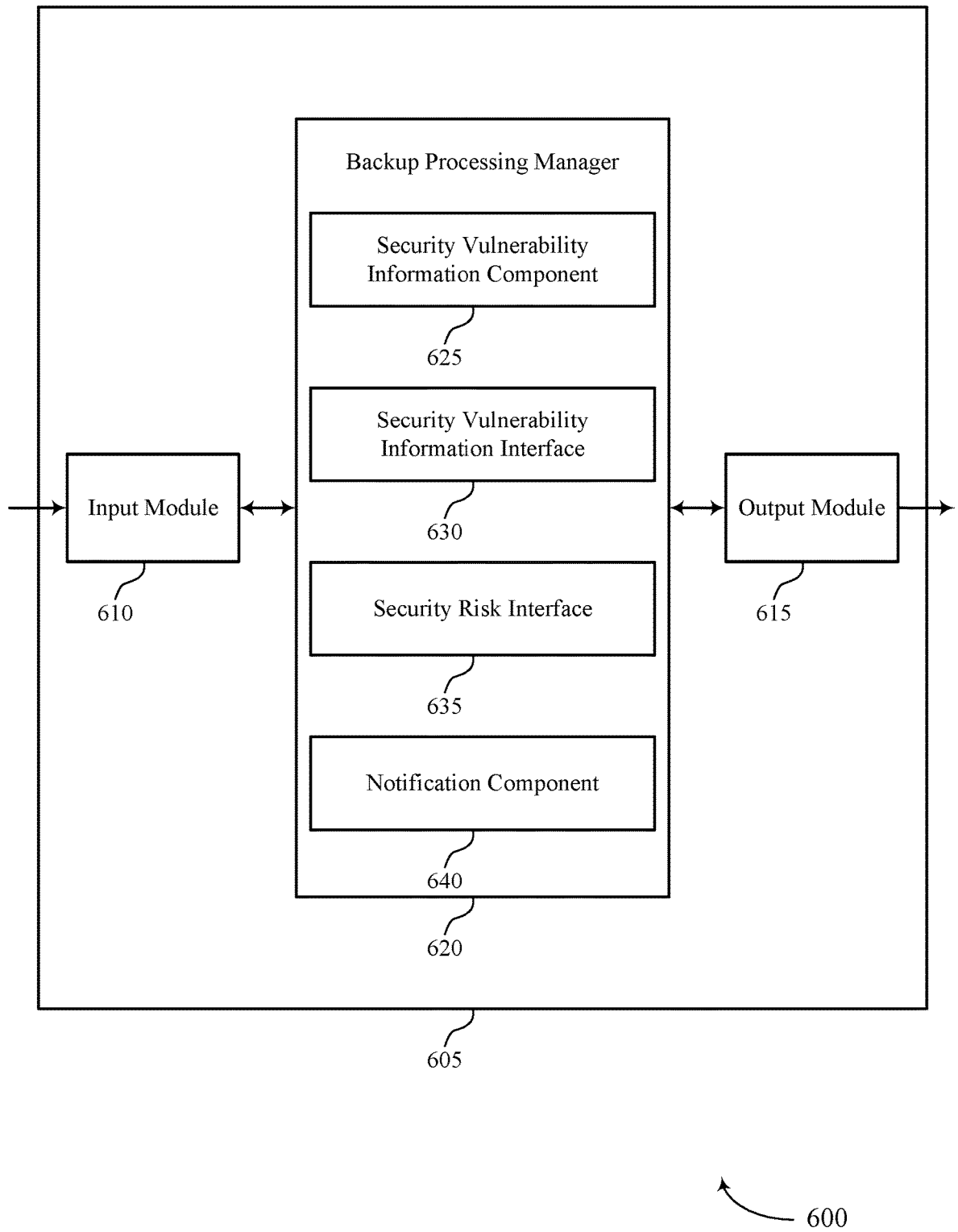
FIG. 6 shows a block diagram of an apparatus that supports security risk assessment system for a data management platform in accordance with aspects of the present disclosure.

FIG. 6 shows a block diagram 600 of a device 605 that supports a security risk assessment system for a data management platform in accordance with aspects of the present disclosure. The device 605 may include an input module 610, an output module 615, and a backup processing manager 620. The device 605 may also include a processor. Each of these components may be in communication with one another (e.g., via one or more buses).

The input module 610 may manage input signals for the device 605. For example, the input module 610 may identify or receive signals from one or more other components in a networked computing environment. In some examples, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the backup processing manager 620 to support security risk assessment system for a data management platform. In some cases, the input module 610 may be a component of a network interface 810 as described with reference to FIG. 8.

The output module 615 may manage output signals for the device 605. For example, the output module 615 may receive signals from other components of the device 605, such as the backup processing manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of a network interface 810 as described with reference to FIG. 8.

For example, the backup processing manager 620 may include a security vulnerability information component 625, a security vulnerability information interface 630, a security risk interface 635, a notification component 640, or any combination thereof. In some examples, the backup processing manager 620, or various components thereof, may be configured to perform various operations (e.g., receiving, monitoring, transmitting) using or otherwise in cooperation with the input module 610, the output module 615, or both. For example, the backup processing manager 620 may receive information from the input module 610, send information to the output module 615, or be integrated in combination with the input module 610, the output module 615, or both to receive information, transmit information, or perform various other operations as described herein.

The security vulnerability information component 625 may be configured as or otherwise support a means for identifying, at a cloud platform that is configured to manage a set of multiple virtual machine management systems, security vulnerability information associated with virtual machines. The security vulnerability information interface 630 may be configured as or otherwise support a means for transmitting, to a virtual machine management system, an indication of the security vulnerability information that is configured for ingestion by the virtual machine management system, where the virtual machine management system can use the security vulnerability information in processing backup snapshots generated by virtual machines to identify security vulnerabilities. The security risk interface 635 may be configured as or otherwise support a means for receiving, from the virtual machine management system, an indication of one or more security risks of a virtual machine managed by the virtual machine management system, where the one or more security risks are identified by the virtual machine management system based on processing of backup snapshots generated by the virtual machines and using the security vulnerability information. The notification component 640 may be configured as or otherwise support a means for generating a notification that indicates the one or more security risks and an identifier of the virtual machine.

Figure 7:
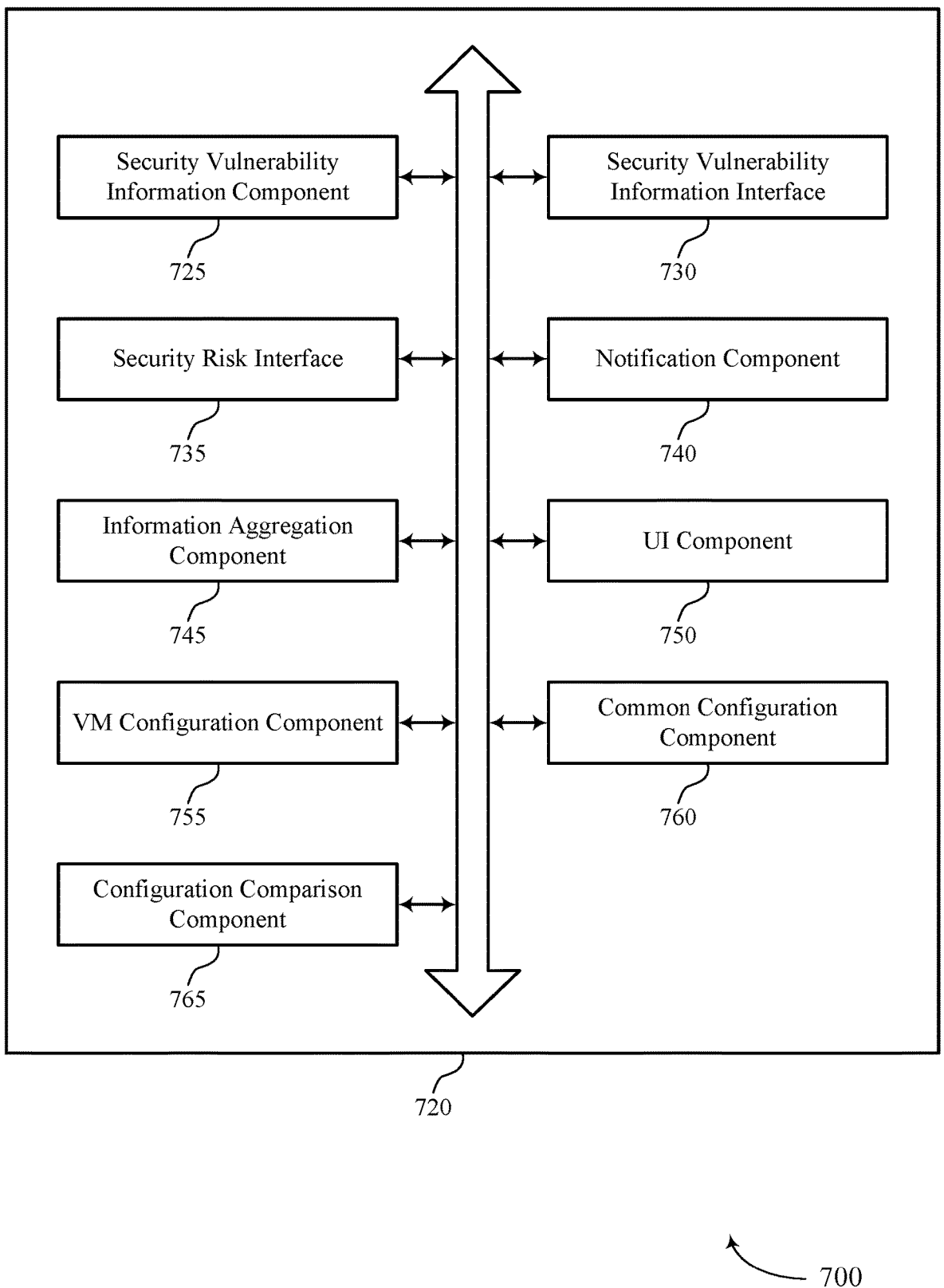
FIG. 7 shows a block diagram of a backup processing manager that supports security risk assessment system for a data management platform in accordance with aspects of the present disclosure.

FIG. 7 shows a block diagram 700 of a backup processing manager 720 that supports security risk assessment system for a data management platform in accordance with aspects of the present disclosure. The backup processing manager 720 may be an example of aspects of a backup processing manager 620 as described herein. The backup processing manager 720, or various components thereof, may be an example of means for performing various aspects of a security risk assessment system for a data management platform as described herein For example, the backup processing manager 720 may include a security vulnerability information component 725, a security vulnerability information interface 730, a security risk interface 735, a notification component 740, an information aggregation component 745, a UI component 750, a VM configuration component 755, a common configuration component 760, a configuration comparison component 765, or any combination thereof. Each of these components may communicate, directly or indirectly, with one another (e.g., via one or more buses).

The security vulnerability information component 725 may be configured as or otherwise support a means for identifying, at a cloud platform that is configured to manage a set of multiple virtual machine management systems, security vulnerability information associated with virtual machines. The security vulnerability information interface 730 may be configured as or otherwise support a means for transmitting, to a virtual machine management system, an indication of the security vulnerability information that is configured for ingestion by the virtual machine management system, where the virtual machine management system can use the security vulnerability information in processing backup snapshots generated by virtual machines to identify security vulnerabilities. The security risk interface 735 may be configured as or otherwise support a means for receiving, from the virtual machine management system, an indication of one or more security risks of a virtual machine managed by the virtual machine management system, where the one or more security risks are identified by the virtual machine management system based on processing of backup snapshots generated by the virtual machines and using the security vulnerability information. The notification component 740 may be configured as or otherwise support a means for generating a notification that indicates the one or more security risks and an identifier of the virtual machine.

In some examples, the security risk interface 735 may be configured as or otherwise support a means for receiving, from one or more additional virtual machine management systems, an indication of one or more security risks of virtual machines managed by the one or more additional virtual machine management systems. In some examples, the information aggregation component 745 may be configured as or otherwise support a means for aggregating information associated with the one or more security risks of virtual machines managed by the one or more additional virtual machine management systems with the one or more security risks of the virtual machine managed by the virtual machine management system. In some examples, the UI component 750 may be configured as or otherwise support a means for causing to display a user interface that includes the aggregated information.

In some examples, the user interface indicates a number of virtual machines that are in compliance or out of compliance based on the one or more security risks, a number of total security risks across virtual machines managed by the set of multiple virtual machine management systems, or a combination thereof.

In some examples, the VM configuration component 755 may be configured as or otherwise support a means for receiving, from one or more of the set of multiple virtual machine management systems, an indication of configuration information of corresponding virtual machines. In some examples, the common configuration component 760 may be configured as or otherwise support a means for determining, using the configuration information, a set of common configurations that are supported by a set of multiple virtual machines. In some examples, the configuration comparison component 765 may be configured as or otherwise support a means for comparing the set of common configurations to configuration information associated with the virtual machine managed by the virtual machine management system. In some examples, the notification component 740 may be configured as or otherwise support a means for generating a notification that indicates a result of the comparing.

In some examples, to support identifying the security vulnerability information, the security vulnerability information component 725 may be configured as or otherwise support a means for receiving one or more indications of current software versions of a set of software packages installed on a set of virtual machines supported by the set of multiple virtual machine management systems.

In some examples, to support identifying the security vulnerability information, the security vulnerability information component 725 may be configured as or otherwise support a means for receiving one or more indications of security vulnerabilities associated with a set of software packages installed on a set of virtual machines supported by the set of multiple virtual machine management systems.

In some examples, to support identifying the security vulnerability information, the security vulnerability information component 725 may be configured as or otherwise support a means for receiving one or more indications of recommended configuration parameters associated with a set of software packages installed on a set of virtual machines supported by the set of multiple virtual machine management systems.

In some examples, to support identifying the security vulnerability information, the security vulnerability information component 725 may be configured as or otherwise support a means for receiving, via a user interface, an indication of one or more target files of the virtual machines, an indication of one or more target configurations of the virtual machines, or both.

In some examples, to support generating a notification, the notification component 740 may be configured as or otherwise support a means for generating the notification that includes information about the one or more security risks, a link to remediation of the one or more security risks, or both.

Figure 8:
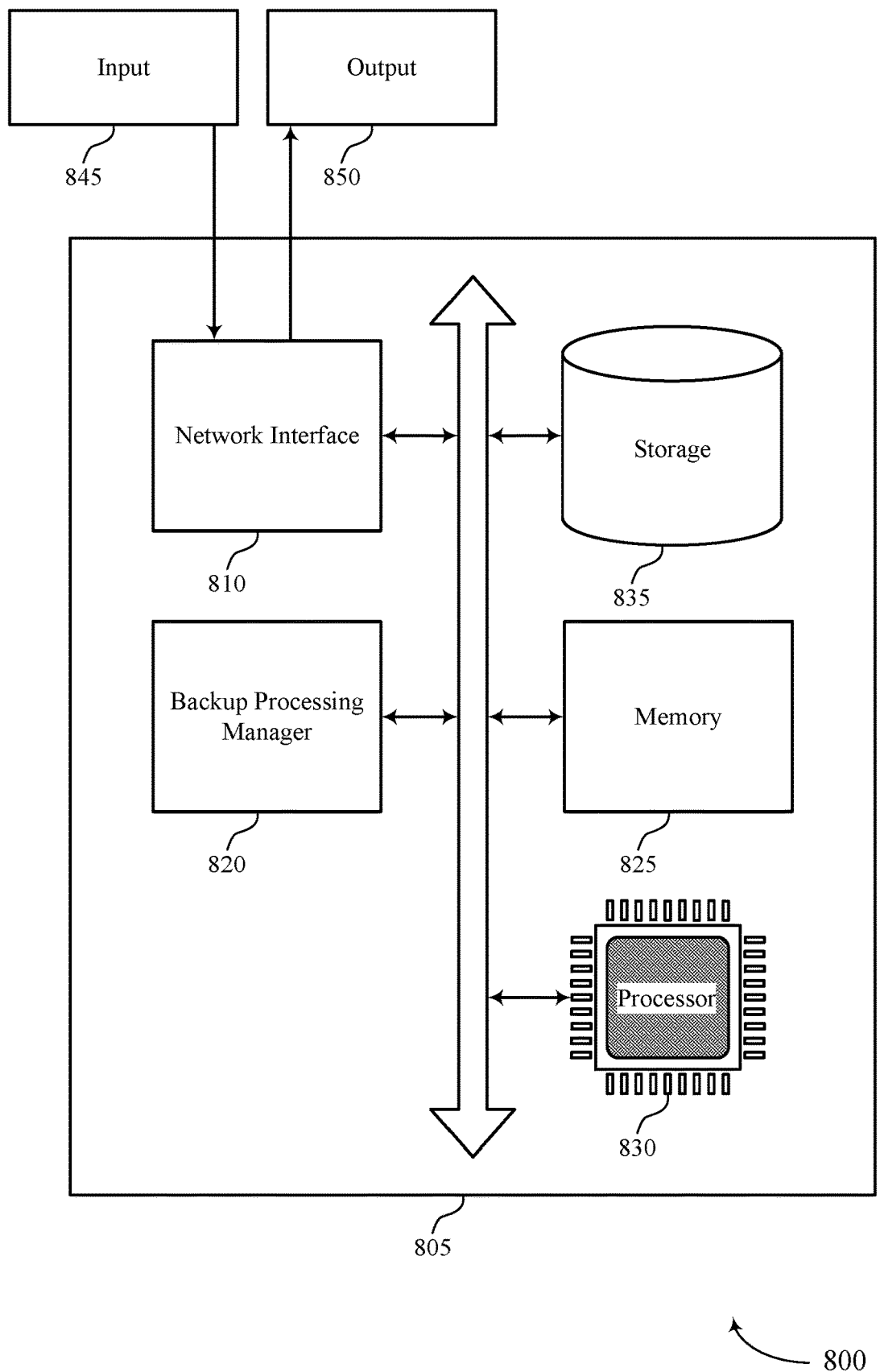
FIG. 8 shows a diagram of a system including a device that supports security risk assessment system for a data management platform in accordance with aspects of the present disclosure.

FIG. 8 shows a diagram of a system 800 including a device 805 that supports a security risk assessment system for a data management platform in accordance with aspects of the present disclosure. The device 805 may be an example of or include the components of a device 605 as described herein. The device 805 may include components for data management, including components such as a backup processing manager 820, a network interface 810, a memory 825, a processor 830, and storage 835. These components may be in electronic communication or otherwise coupled (e.g., operatively, communicatively, functionally, electronically, electrically; via one or more busses, communications links, communications interfaces, or any combination thereof).

The network interface 810 may enable the device 805 to exchange information (e.g., input information 845, output information 850, or both) with other systems or devices (not shown). For example, the network interface 810 may enable the device 805 to connect to a network (e.g., a network 120 as described herein). The network interface 810 may include one or more wireless network interfaces, one or more wired network interfaces, or any combination thereof. In some examples, the network interface 810 may be an example of one or more devices or aspects of FIG. 1 such as one or more network interfaces 165 as described herein.

Memory 825 may include RAM, ROM, or both. The memory 825 may store computer-readable, computer-executable software including instructions that, when executed, cause the processor 830 to perform various functions described herein. In some cases, the memory 825 may contain, among other things, a basic input/output system (BIOS), which may control basic hardware or software operation such as the interaction with peripheral components or devices. In some cases, the memory 825 may be an example of one or more devices or aspects of FIG. 1 such as one or more memories 175 as described herein.

Storage 835 may be configured to store data generated, processed, stored, or otherwise used by the device 805. In some cases, the storage 835 may include one or more HDDs, one or more SDDs, or both. In some examples, the storage 835 may be an example of a single database, a distributed database, multiple distributed databases, a data store, a data lake, or an emergency backup database. In some examples, the storage 835 may be an example of one or more devices or aspects of FIG. 1 such as one or more network disks 180 as described herein.

The processor 830 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 830 may be configured to execute computer-readable instructions stored in a memory 825 to perform various functions (e.g., functions or tasks supporting techniques for security risk assessment). Though a single processor 830 is depicted in the example of FIG. 8, it is to be understood that the device 805 may include any quantity of one or more of processors 830 and that a group of processors 830 may collectively perform one or more functions ascribed herein to a processor, such as the processor 830. In some cases, the processor 830 may be an example of one or more devices or aspects of FIG. 1 such as one or more processors 170 as described herein.

The backup processing manager 820 may be configured as or otherwise support a means for identifying, at a cloud platform that is configured to manage a set of multiple virtual machine management systems, security configuration information associated with virtual machines. The backup processing manager 820 may be configured as or otherwise support a means for transmitting, to a virtual machine management system, an indication of the security configuration information that is configured for ingestion by the virtual machine management system, where the virtual machine management system can use the security configuration information in processing backup snapshots generated by virtual machines to identify security vulnerabilities. The backup processing manager 820 may be configured as or otherwise support a means for receiving, from the virtual machine management system, an indication of one or more security risks of a virtual machine managed by the virtual machine management system, where the one or more security risks are identified by the virtual machine management system based on processing of backup snapshots generated by the virtual machines and using the security configuration information. The backup processing manager 820 may be configured as or otherwise support a means for generating a notification that indicates the one or more security risks and an identifier of the virtual machine.

Figure 9:
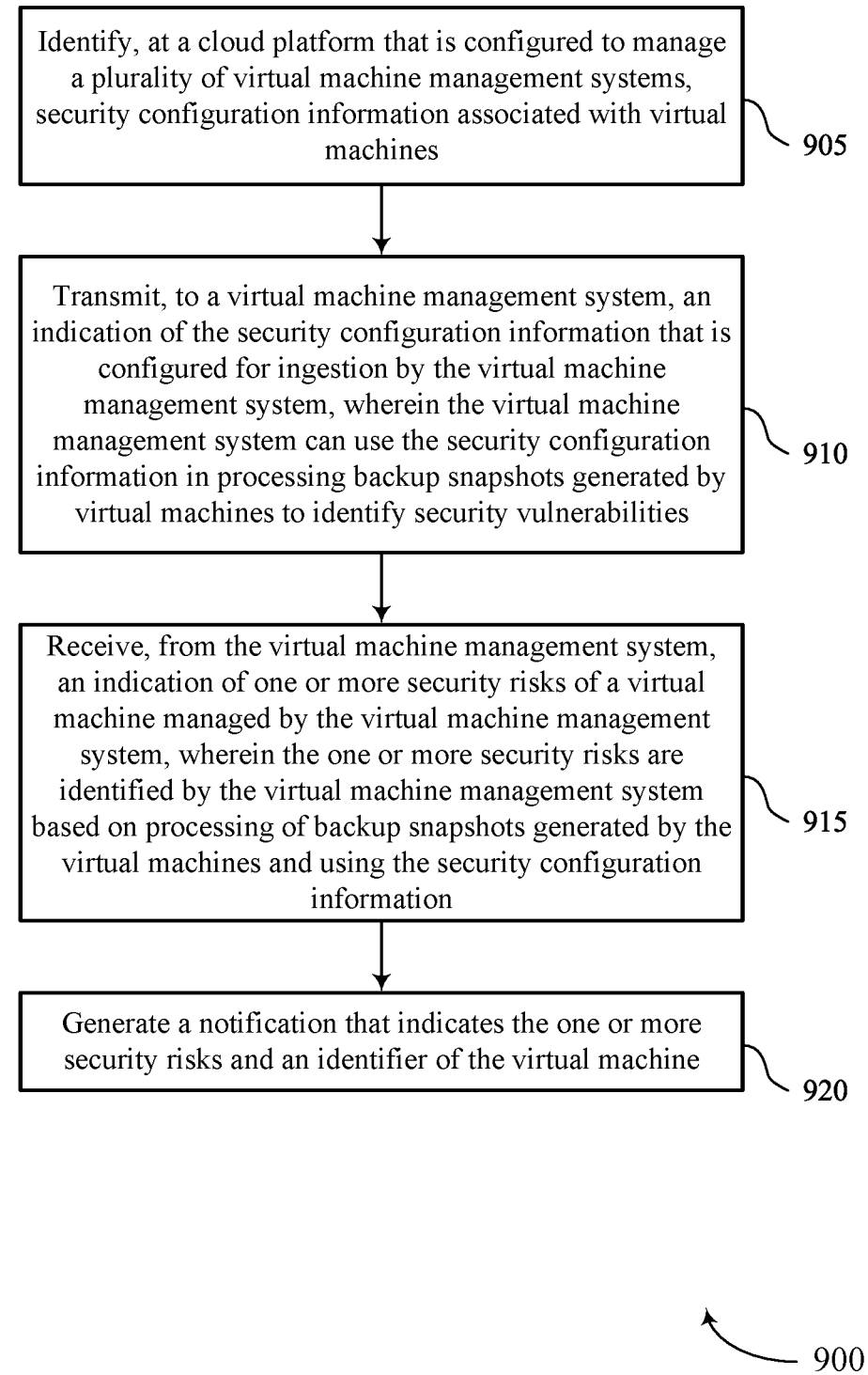
FIGS. 9 through 11 show flowcharts illustrating methods that support security risk assessment system for a data management platform in accordance with aspects of the present disclosure.

FIG. 9 shows a flowchart illustrating a method 900 that supports a security risk assessment system for a data management platform in accordance with aspects of the present disclosure. The operations of the method 900 may be implemented by a system or its components as described herein. For example, the operations of the method 900 may be performed by a data management system as described with reference to FIGS. 1 through 8. In some examples, a system may execute a set of instructions to control the functional elements of the data management system to perform the described functions. Additionally, or alternatively, the system may perform aspects of the described functions using special-purpose hardware.

At 905, the method may include identifying, at a cloud platform that is configured to manage a set of multiple virtual machine management systems, security configuration information associated with virtual machines. The operations of 905 may be performed in accordance with examples as disclosed herein. In some examples, aspects of the operations of 905 may be performed by a security vulnerability information component 725 as described with reference to FIG. 7.

At 910, the method may include transmitting, to a virtual machine management system, an indication of the security configuration information that is configured for ingestion by the virtual machine management system, where the virtual machine management system can use the security configuration information in processing backup snapshots generated by virtual machines to identify security vulnerabilities. The operations of 910 may be performed in accordance with examples as disclosed herein. In some examples, aspects of the operations of 910 may be performed by a security vulnerability information interface 730 as described with reference to FIG. 7.

At 915, the method may include receiving, from the virtual machine management system, an indication of one or more security risks of a virtual machine managed by the virtual machine management system, where the one or more security risks are identified by the virtual machine management system based on processing of backup snapshots generated by the virtual machines and using the security configuration information. The operations of 915 may be performed in accordance with examples as disclosed herein. In some examples, aspects of the operations of 915 may be performed by a security risk interface 735 as described with reference to FIG. 7.

At 920, the method may include generating a notification that indicates the one or more security risks and an identifier of the virtual machine. The operations of 920 may be performed in accordance with examples as disclosed herein. In some examples, aspects of the operations of 920 may be performed by a notification component 740 as described with reference to FIG. 7.

Figure 10:
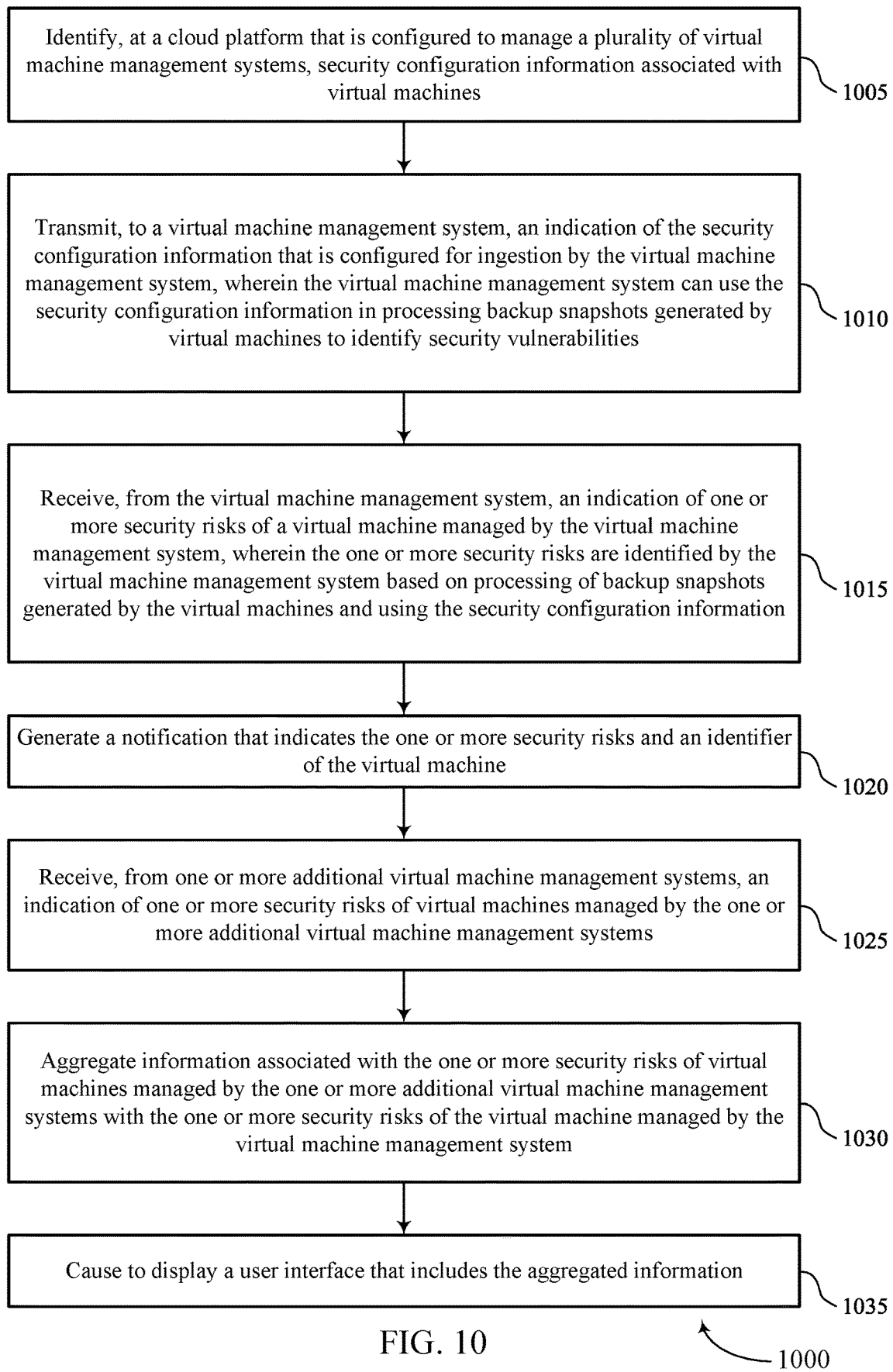

FIG. 10 shows a flowchart illustrating a method 1000 that supports a security risk assessment system for a data management platform in accordance with aspects of the present disclosure. The operations of the method 1000 may be implemented by a system or its components as described herein. For example, the operations of the method 1000 may be performed by a data management system as described with reference to FIGS. 1 through 8. In some examples, a system may execute a set of instructions to control the functional elements of the data management system to perform the described functions. Additionally, or alternatively, the system may perform aspects of the described functions using special-purpose hardware.

At 1005, the method may include identifying, at a cloud platform that is configured to manage a set of multiple virtual machine management systems, security configuration information associated with virtual machines. The operations of 1005 may be performed in accordance with examples as disclosed herein. In some examples, aspects of the operations of 1005 may be performed by a security vulnerability information component 725 as described with reference to FIG. 7.

At 1010, the method may include transmitting, to a virtual machine management system, an indication of the security configuration information that is configured for ingestion by the virtual machine management system, where the virtual machine management system can use the security configuration information in processing backup snapshots generated by virtual machines to identify security vulnerabilities. The operations of 1010 may be performed in accordance with examples as disclosed herein. In some examples, aspects of the operations of 1010 may be performed by a security vulnerability information interface 730 as described with reference to FIG. 7.

At 1015, the method may include receiving, from the virtual machine management system, an indication of one or more security risks of a virtual machine managed by the virtual machine management system, where the one or more security risks are identified by the virtual machine management system based on processing of backup snapshots generated by the virtual machines and using the security configuration information. The operations of 1015 may be performed in accordance with examples as disclosed herein. In some examples, aspects of the operations of 1015 may be performed by a security risk interface 735 as described with reference to FIG. 7.

At 1020, the method may include generating a notification that indicates the one or more security risks and an identifier of the virtual machine. The operations of 1020 may be performed in accordance with examples as disclosed herein. In some examples, aspects of the operations of 1020 may be performed by a notification component 740 as described with reference to FIG. 7.

At 1025, the method may include receiving, from one or more additional virtual machine management systems, an indication of one or more security risks of virtual machines managed by the one or more additional virtual machine management systems. The operations of 1025 may be performed in accordance with examples as disclosed herein. In some examples, aspects of the operations of 1025 may be performed by a security risk interface 735 as described with reference to FIG. 7.

At 1030, the method may include aggregating information associated with the one or more security risks of virtual machines managed by the one or more additional virtual machine management systems with the one or more security risks of the virtual machine managed by the virtual machine management system. The operations of 1030 may be performed in accordance with examples as disclosed herein. In some examples, aspects of the operations of 1030 may be performed by an information aggregation component 745 as described with reference to FIG. 7.

At 1035, the method may include causing to display a user interface that includes the aggregated information. The operations of 1035 may be performed in accordance with examples as disclosed herein. In some examples, aspects of the operations of 1035 may be performed by a UI component 750 as described with reference to FIG. 7.

Figure 11:
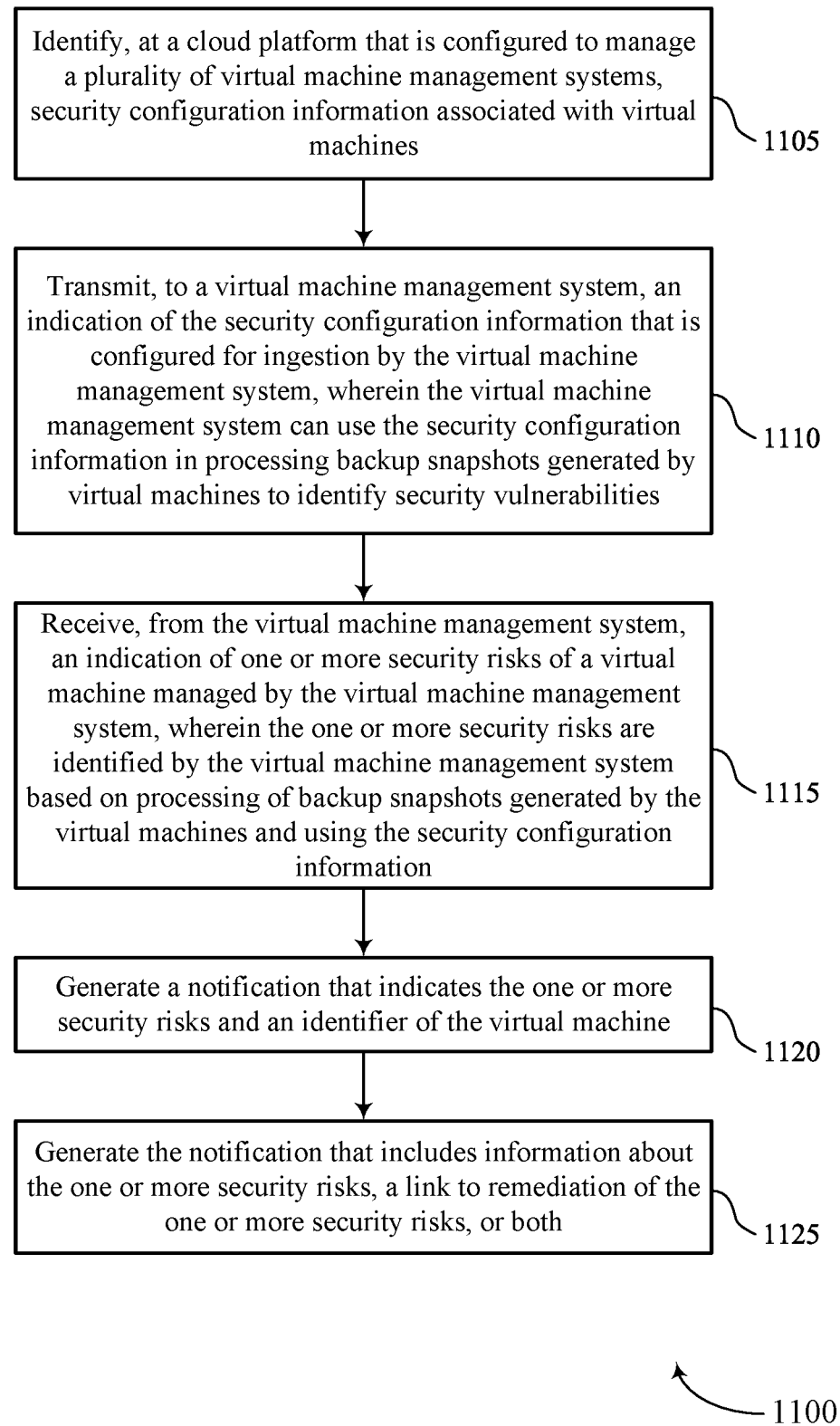

FIG. 11 shows a flowchart illustrating a method 1100 that supports a security risk assessment system for a data management platform in accordance with aspects of the present disclosure. The operations of the method 1100 may be implemented by a system or its components as described herein. For example, the operations of the method 1100 may be performed by a data management system as described with reference to FIGS. 1 through 8. In some examples, a system may execute a set of instructions to control the functional elements of the data management system to perform the described functions. Additionally, or alternatively, the system may perform aspects of the described functions using special-purpose hardware.

At 1105, the method may include identifying, at a cloud platform that is configured to manage a set of multiple virtual machine management systems, security configuration information associated with virtual machines. The operations of 1105 may be performed in accordance with examples as disclosed herein. In some examples, aspects of the operations of 1105 may be performed by a security vulnerability information component 725 as described with reference to FIG. 7.

At 1110, the method may include transmitting, to a virtual machine management system, an indication of the security configuration information that is configured for ingestion by the virtual machine management system, where the virtual machine management system can use the security configuration information in processing backup snapshots generated by virtual machines to identify security vulnerabilities. The operations of 1110 may be performed in accordance with examples as disclosed herein. In some examples, aspects of the operations of 1110 may be performed by a security vulnerability information interface 730 as described with reference to FIG. 7.

At 1115, the method may include receiving, from the virtual machine management system, an indication of one or more security risks of a virtual machine managed by the virtual machine management system, where the one or more security risks are identified by the virtual machine management system based on processing of backup snapshots generated by the virtual machines and using the security configuration information. The operations of 1115 may be performed in accordance with examples as disclosed herein. In some examples, aspects of the operations of 1115 may be performed by a security risk interface 735 as described with reference to FIG. 7.

At 1120, the method may include generating a notification that indicates the one or more security risks and an identifier of the virtual machine. The operations of 1120 may be performed in accordance with examples as disclosed herein. In some examples, aspects of the operations of 1120 may be performed by a notification component 740 as described with reference to FIG. 7.

At 1125, the method may include generating the notification that includes information about the one or more security risks, a link to remediation of the one or more security risks, or both. The operations of 1125 may be performed in accordance with examples as disclosed herein.

In some examples, aspects of the operations of 1125 may be performed by a notification component 740 as described with reference to FIG. 7.

A method is described. The method may include identifying, at a cloud platform that is configured to manage a set of multiple virtual machine management systems, security configuration information associated with virtual machines, transmitting, to a virtual machine management system, an indication of the security configuration information that is configured for ingestion by the virtual machine management system, where the virtual machine management system can use the security configuration information in processing backup snapshots generated by virtual machines to identify security vulnerabilities, receiving, from the virtual machine management system, an indication of one or more security risks of a virtual machine managed by the virtual machine management system, where the one or more security risks are identified by the virtual machine management system based on processing of backup snapshots generated by the virtual machines and using the security configuration information, and generating a notification that indicates the one or more security risks and an identifier of the virtual machine.

An apparatus is described. The apparatus may include a processor, memory coupled with the processor, and instructions stored in the memory. The instructions may be executable by the processor to cause the apparatus to identify, at a cloud platform that is configured to manage a set of multiple virtual machine management systems, security configuration information associated with virtual machines, transmit, to a virtual machine management system, an indication of the security configuration information that is configured for ingestion by the virtual machine management system, where the virtual machine management system can use the security configuration information in processing backup snapshots generated by virtual machines to identify security vulnerabilities, receive, from the virtual machine management system, an indication of one or more security risks of a virtual machine managed by the virtual machine management system, where the one or more security risks are identified by the virtual machine management system based on processing of backup snapshots generated by the virtual machines and using the security configuration information, and generate a notification that indicates the one or more security risks and an identifier of the virtual machine.

Another apparatus is described. The apparatus may include means for identifying, at a cloud platform that is configured to manage a set of multiple virtual machine management systems, security configuration information associated with virtual machines, means for transmitting, to a virtual machine management system, an indication of the security configuration information that is configured for ingestion by the virtual machine management system, where the virtual machine management system can use the security configuration information in processing backup snapshots generated by virtual machines to identify security vulnerabilities, means for receiving, from the virtual machine management system, an indication of one or more security risks of a virtual machine managed by the virtual machine management system, where the one or more security risks are identified by the virtual machine management system based on processing of backup snapshots generated by the virtual machines and using the security configuration information, and means for generating a notification that indicates the one or more security risks and an identifier of the virtual machine.

A non-transitory computer-readable medium storing code is described. The code may include instructions executable by a processor to identify, at a cloud platform that is configured to manage a set of multiple virtual machine management systems, security configuration information associated with virtual machines, transmit, to a virtual machine management system, an indication of the security configuration information that is configured for ingestion by the virtual machine management system, where the virtual machine management system can use the security configuration information in processing backup snapshots generated by virtual machines to identify security vulnerabilities, receive, from the virtual machine management system, an indication of one or more security risks of a virtual machine managed by the virtual machine management system, where the one or more security risks are identified by the virtual machine management system based on processing of backup snapshots generated by the virtual machines and using the security configuration information, and generate a notification that indicates the one or more security risks and an identifier of the virtual machine.

Some examples of the method, apparatuses, and non-transitory computer-readable medium described herein may further include operations, features, means, or instructions for receiving, from one or more additional virtual machine management systems, an indication of one or more security risks of virtual machines managed by the one or more additional virtual machine management systems, aggregating information associated with the one or more security risks of virtual machines managed by the one or more additional virtual machine management systems with the one or more security risks of the virtual machine managed by the virtual machine management system, and causing to display a user interface that includes the aggregated information.

In some examples of the method, apparatuses, and non-transitory computer-readable medium described herein, the user interface indicates a number of virtual machines that may be in compliance or out of compliance based on the one or more security risks, a number of total security risks across virtual machines managed by the set of multiple virtual machine management systems, or a combination thereof.

Some examples of the method, apparatuses, and non-transitory computer-readable medium described herein may further include operations, features, means, or instructions for receiving, from one or more of the set of multiple virtual machine management systems, an indication of configuration information of corresponding virtual machines, determining, using the configuration information, a set of common configurations that may be support by a set of multiple virtual machines, comparing the set of common configurations to configuration information associated with the virtual machine managed by the virtual machine management system, and generating a notification that indicates a result of the comparing.

In some examples of the method, apparatuses, and non-transitory computer-readable medium described herein, identifying the security configuration information may include operations, features, means, or instructions for receiving one or more indications of current software versions of a set of software packages installed on a set of virtual machines supported by the set of multiple virtual machine management systems.

In some examples of the method, apparatuses, and non-transitory computer-readable medium described herein, identifying the security configuration information may include operations, features, means, or instructions for receiving one or more indications of security vulnerabilities associated with a set of software packages installed on a set of virtual machines supported by the set of multiple virtual machine management systems.

In some examples of the method, apparatuses, and non-transitory computer-readable medium described herein, identifying the security configuration information may include operations, features, means, or instructions for receiving one or more indications of recommended configuration parameters associated with a set of software packages installed on a set of virtual machines supported by the set of multiple virtual machine management systems.

In some examples of the method, apparatuses, and non-transitory computer-readable medium described herein, identifying the security configuration information may include operations, features, means, or instructions for receiving, via a user interface, an indication of one or more target files of the virtual machines, an indication of one or more target configurations of the virtual machines, or both.

In some examples of the method, apparatuses, and non-transitory computer-readable medium described herein, generating a notification may include operations, features, means, or instructions for generating the notification that includes information about the one or more security risks, a link to remediation of the one or more security risks, or both.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management comprising:
identifying, at a cloud platform that is configured to manage a plurality of virtual machine management systems, security configuration information associated with virtual machines;
transmitting, to a virtual machine management system, an indication of the security configuration information that is configured for ingestion by the virtual machine management system, wherein the virtual machine management system uses the security configuration information in processing backup snapshots generated by virtual machines to identify security vulnerabilities;
receiving, from the virtual machine management system, an indication of one or more first security risks of a virtual machine managed by the virtual machine management system, wherein the one or more first security risks are identified by the virtual machine management system based on processing of one or more backup snapshots generated by the virtual machines and using the security configuration information;
receiving, from one or more additional virtual machine management systems, an indication of one or more second security risks of virtual machines managed by the one or more additional virtual machine management systems;
aggregating information associated with the one or more second security risks of virtual machines managed by the one or more additional virtual machine management systems with the one or more first security risks of the virtual machines managed by the virtual machine management system;
generating a notification that indicates the one or more first security risks and an identifier of the virtual machine; and
causing to display a user interface that includes the aggregated information.

2. The method of claim 1, wherein the user interface indicates a number of virtual machines that are in compliance or out of compliance based at least in part on the one or more first security risks, a number of total security risks across virtual machines managed by the plurality of virtual machine management systems, or a combination thereof.

3. The method of claim 1, further comprising:
receiving, from one or more of the plurality of virtual machine management systems, an indication of configuration information of corresponding virtual machines;
determining, using the configuration information, a set of common configurations that are supported by a plurality of virtual machines;
comparing the set of common configurations to configuration information associated with the virtual machine managed by the virtual machine management system; and
generating a notification that indicates a result of the comparing.

4. The method of claim 1, wherein identifying the security configuration information comprises:
receiving one or more indications of current software versions of a set of software packages installed on a set of virtual machines supported by the plurality of virtual machine management systems.

5. The method of claim 1, wherein identifying the security configuration information comprises:
receiving one or more indications of security vulnerabilities associated with a set of software packages installed on a set of virtual machines supported by the plurality of virtual machine management systems.

6. The method of claim 1, wherein identifying the security configuration information comprises:
receiving one or more indications of recommended configuration parameters associated with a set of software packages installed on a set of virtual machines supported by the plurality of virtual machine management systems.

7. The method of claim 1, wherein identifying the security configuration information comprises:
receiving, via the user interface, an indication of one or more target files of the virtual machines, an indication of one or more target configurations of the virtual machines, or both.

8. The method of claim 1, wherein generating a notification comprises:
generating the notification that includes information about the one or more first security risks, a link to remediation of the one or more first security risks, or both.

9. An apparatus, comprising:
a processor;
memory coupled with the processor; and
instructions stored in the memory and executable by the processor to cause the apparatus to:
identify, at a cloud platform that is configured to manage a plurality of virtual machine management systems, security configuration information associated with virtual machines;
transmit, to a virtual machine management system, an indication of the security configuration information that is configured for ingestion by the virtual machine management system, wherein the virtual machine management system uses the security configuration information in processing backup snapshots generated by virtual machines to identify security vulnerabilities;
receive, from the virtual machine management system, an indication of one or more first security risks of a virtual machine managed by the virtual machine management system, wherein the one or more first security risks are identified by the virtual machine management system based on processing of one or more backup snapshots generated by the virtual machines and using the security configuration information;
receive, from one or more additional virtual machine management systems, an indication of one or more second security risks of virtual machines managed by the one or more additional virtual machine management systems;
aggregate information associated with the one or more second security risks of virtual machines managed by the one or more additional virtual machine management systems with the one or more first security risks of the virtual machines managed by the virtual machine management system;
generate a notification that indicates the one or more first security risks and an identifier of the virtual machine; and cause to display a user interface that includes the aggregated information.

10. The apparatus of claim 9, wherein the user interface indicates a number of virtual machines that are in compliance or out of compliance based at least in part on the one or more first security risks, a number of total security risks across virtual machines managed by the plurality of virtual machine management systems, or a combination thereof.

11. The apparatus of claim 9, wherein the instructions are further executable by the processor to cause the apparatus to:
receive, from one or more of the plurality of virtual machine management systems, an indication of configuration information of corresponding virtual machines;
determine, using the configuration information, a set of common configurations that are supported by a plurality of virtual machines;
compare the set of common configurations to configuration information associated with the virtual machine managed by the virtual machine management system; and
generate a notification that indicates a result of the comparing.

12. The apparatus of claim 9, wherein the instructions to identify the security configuration information are executable by the processor to cause the apparatus to:
receive one or more indications of current software versions of a set of software packages installed on a set of virtual machines supported by the plurality of virtual machine management systems.

13. The apparatus of claim 9, wherein the instructions to identify the security configuration information are executable by the processor to cause the apparatus to:
receive one or more indications of security vulnerabilities associated with a set of software packages installed on a set of virtual machines supported by the plurality of virtual machine management systems.

14. A non-transitory computer-readable medium storing code, the code comprising instructions executable by a processor to:
identify, at a cloud platform that is configured to manage a plurality of virtual machine management systems, security configuration information associated with virtual machines;
transmit, to a virtual machine management system, an indication of the security configuration information that is configured for ingestion by the virtual machine management system, wherein the virtual machine management system uses the security configuration information in processing backup snapshots generated by virtual machines to identify security vulnerabilities;
receive, from the virtual machine management system, an indication of one or more first security risks of a virtual machine managed by the virtual machine management system, wherein the one or more first security risks are identified by the virtual machine management system based on processing of one or more backup snapshots generated by the virtual machines and using the security configuration information;
receive, from one or more additional virtual machine management systems, an indication of one or more second security risks of virtual machines managed by the one or more additional virtual machine management systems;
aggregate information associated with the one or more second security risks of virtual machines managed by the one or more additional virtual machine management systems with the one or more first security risks of the virtual machines managed by the virtual machine management system;
generate a notification that indicates the one or more first security risks and an identifier of the virtual machine; and
cause to display a user interface that includes the aggregated information.

15. The non-transitory computer-readable medium of claim 14, wherein the user interface indicates a number of virtual machines that are in compliance or out of compliance based at least in part on the one or more first security risks, a number of total security risks across virtual machines managed by the plurality of virtual machine management systems, or a combination thereof.

16. The non-transitory computer-readable medium of claim 14, wherein the instructions are further executable by the processor to:
receive, from one or more of the plurality of virtual machine management systems, an indication of configuration information of corresponding virtual machines;
determine, using the configuration information, a set of common configurations that are supported by a plurality of virtual machines;
compare the set of common configurations to configuration information associated with the virtual machine managed by the virtual machine management system; and
generate a notification that indicates a result of the comparing.

17. The non-transitory computer-readable medium of claim 14, wherein the instructions to identify the security configuration information are executable by the processor to:
receive one or more indications of current software versions of a set of software packages installed on a set of virtual machines supported by the plurality of virtual machine management systems.

* * * * *